United States Patent
Lo et al.

[11] Patent Number: 5,954,508
[45] Date of Patent: Sep. 21, 1999

[54] PORTABLE AND COMPACT MOTION SIMULATOR

[75] Inventors: Patrick K. Lo, Monterey Park; Robert A. Dietrich, Montebello, both of Calif.

[73] Assignee: Interactive Motion Systems, Monterey Park, Calif.

[21] Appl. No.: 08/915,259

[22] Filed: Aug. 20, 1997

[51] Int. Cl.[6] .................................................. G09B 9/00
[52] U.S. Cl. ..................... 434/55; 434/44; 434/58; 434/69; 434/307 R; 297/257; 463/46
[58] Field of Search ................... 434/29–35, 37, 434/40, 43, 45, 51, 55–62, 69, 365, 372; 472/7, 8, 29, 32, 33, 59–61, 128, 130; 463/2, 34, 46; 497/240, 257, 344.2, 344.16, 344.17; 364/578; 395/500

[56] References Cited

U.S. PATENT DOCUMENTS

| | | |
|---|---|---|
| 4,343,610 | 8/1982 | Chou . |
| 4,478,407 | 10/1984 | Manabe . |
| 4,711,447 | 12/1987 | Mansfield ........................ 482/902 X |
| 4,976,438 | 12/1990 | Tashiro et al. .................. 434/55 X |
| 5,022,708 | 6/1991 | Nordella et al. . |
| 5,199,875 | 4/1993 | Trumbull ........................ 434/58 X |
| 5,219,315 | 6/1993 | Fuller et al. .................... 434/58 X |
| 5,316,480 | 5/1994 | Ellsworth . |
| 5,490,784 | 2/1996 | Carmein ......................... 434/55 |
| 5,509,806 | 4/1996 | Ellsworth . |
| 5,533,935 | 7/1996 | Kast ............................... 434/55 X |
| 5,584,697 | 12/1996 | Trumbull ........................ 434/55 |
| 5,605,462 | 2/1997 | Denne . |
| 5,678,889 | 10/1997 | Purcell, Jr. ..................... 297/257 |
| 5,752,834 | 5/1998 | Ling ............................... 434/58 |

FOREIGN PATENT DOCUMENTS 5-323860  12/1993  Japan .

*Primary Examiner*—Joe H. Cheng

[57] ABSTRACT

The portable and compact motion stimulator (10) comprises of a platform (22), a support base (20), three extensible members (24), and a motion base controller (26). The simulator can be used like a seat cushion that can be placed on a chair or can be a part of a chair. The motion base controller (26) drives the extensible members (24) to produce rotations about the pitch axis (14), roll axis (16), and translation in the heave (18) direction in synchronization with audio and visual images. The motion simulator system can be used interactively with a computer game or in a virtual reality environment. Numerous motion simulators can be linked to a common system controller (12) to provide identical synchronous motions to a plurality of users in a theater application.

14 Claims, 9 Drawing Sheets

Prior Art

Prior Art

PORTABLE AND COMPACT MOTION SIMULATOR

BACKGROUND

1. Field of the Invention

This invention relates to a portable and compact motion simulator apparatus, and more particularly, to a motion simulator system designed to simulate motion for a person playing an interactive computer game or participating in a virtual reality experience. Such motion simulators can also be adopted for viewing a visual theater presentation.

2. Description of Prior Art

Motion simulators for training, and amusement are well known in the art. Aircraft simulators for use by the military and airlines incorporate highly sophisticated hydraulic drive systems often offering up to six degrees of freedom. Amusement rides offering motion simulation have typically employed technology very similar to the high fidelity aircraft training simulators while somewhat reducing complexity and cost. A typical system employs a platform having an occupant station which incorporates a means for visual simulation through motion picture or computer-generated scenery imaging. The occupant platform is mounted on or suspended from multiple actuators which impart motion to the platform. Alternatively, the occupant platform is mounted on a multiple-gimbal system with multiple actuators to generate motion. The number and mounting locations of the actuators are determined in engineering tradeoffs for size of the actuators and the equations of motion to be used for the simulation. The continuum of tradeoff between complexity and range of motion has yielded a large number of patented designs.

For amusement rides and motion theater applications, aircraft training simulators are often too large in size, too complex in installation, and too costly to maintain and operate. The solution lies in miniaturization which can reduce the cost of motion simulators in two major ways. Firstly, motion simulators are re-packaged to decrease the overall system size without reducing any range of motion. Decreasing the system size tends to have a cascading effect on the motion base size and component size. Ultimately, the miniaturized motion simulators can be housed in standard commercial building structures. Numerous patent designs have been found to follow this path. Secondly, motion simulators are simplified by reducing the range of motion. Since the required performance for amusement rides or motion theater applications are not as vigorous and stringent as the aircraft training simulators, the exact equations of motion can be modified to maintain the level of excitement with simpler installation. Such simplification reduces hardware compexity as well as demand on computing power to run the simulation. Numerous existing patented designs have been the results of trading off the complexity of the motion system against the range of motion.

All but few of the miniaturization efforts have been directed to optimize commercially or institutionally owned motion simulators. Personal ownership has not been practical because 1) the large size of the system that cannot be practically adopted for home use, 2) a complex system that cannot be reasonably installed and maintained by most people, and 3) the high costs of the motion system and dedicated computer required to run the simulation.

Innovation in the areas of home computing have vastly improved the fidelity of computer games at home. With multi-media presentation, the computer game experience often encompasses visual effects through the graphics display on the video monitor and audio effects through the monitor speakers. But game related hardware are often limited to control devices such as joystick, control pedals, yoke, etc. Motion simulators, which have been proven commercially, are capable of enhancing the home computer game experience to a new level. With the computing power required for complex motion simulation becoming available in most home computers, the prerequiste for home use motion simulation is met. But such adoption is not trivial, the motion simulators have to be miniaturized to an extent that has not been achieved in all known designs. And, they have to be constructed with simplicity and ingenuity to get the cost down to an economically viable level.

From the design standpoint, such motion simulators have to be low-cost and they have to be able to create a sense of motion that can add to the sensation of computer game play. At the same time, the motion simulators have to be small and portable to be accepted by the users. They also have to be simple to install and maintain.

There have been several noted efforts in miniaturization of motion simulators. The "portable simulator apparatus", patented in U.S. Pat. No. 5,316,480 and U.S. Pat No. 5,509,806 (continuation in part of U.S. Pat. No. 5,316,480) to T. Ellsworth dated May 31, 1994 and Apr. 23, 1996 respectively, affords a mobile and transportable motion simulator. Yet the miniaturized system consists of several roadable trailers.

In another known prior-art system, the monitor game machine patented in U.S. Pat. No. 4,478,407 by Manabe dated Oct. 23, 1984 offers a 2 degree-of-freedom system the size of a small compact vehicle.

In two other known prior-art systems, U.S. Pat. No. 5,022,708 to Nordella dated Jun. 11, 1991 and U.S. Pat. No. 5,605,462 to Denne in Feb. 25, 1997, the motion simulators have been brought down to the size of a chair. Even with the amiable efforts, both designs have come short of being suitable for home use or personal ownership.

The last prior-art system worth mentioning in the current context is the design patented in U.S. Pat. No. 4,343,610 by Chou dated Aug. 10, 1982. This motion simulator in this patent is a large system for commercial application.

None of the above patents suggest a truly portable motion simulator or system that can simulate motion for a person playing an interactive computer game or participating in virtual reality experience. Such motion simulators can also be adopted for viewing a visual theater presentation.

OBJECTS AND ADVANTAGES

It is an object of the present invention to provide a three degree-of-freedom portable and compact motion simulator.

It is a further object of the present invention to provide a portable and compact simulator system for interactive computer game and virtual reality experience application.

It is an additional object of the present invention to provide a compact simulator system encompassing special visual effects through motion picture of computer-generated imagery in visual theater presentation applications.

It is yet another object of the present invention to introduce a two degree-of-freedom portable and compact motion simulator. It can also be adopted for playing an interactive computer game, participating in virtual reality experience, or viewing a visual theater presentation.

Accordingly, several advantages of our invention are (a) The portable and compact motion simulator is small in size and light-weight. In the smallest form, it is approximately the size of a seat cushion. It can be placed on a regular chair or armchair when it is in use. It can be stored in a closet or garage when not in use. A young adult can carry the portable and compact motion simulator with ease thus allowing versatility for home use and portability at the personal level.

The Nordella motion simulator is approximately the size of a chair and it allows all six degrees of freedom. In practice, this motion simulator is quite a bit larger after taking into account the hydraulic pump and the fluid reservoir. It also requires a substantial portion of the mechanical system to be installed in a trench below the floor level. While this invention qualifies as a small motion simulator, it fails to meet the home use and portability criteria. Likewise, the Denne motion simulator takes up all the space underneath the seat, requires extra room for hydraulic pumps and fluid reservoir, and needs to be installed onto a floor like structure. Thus it fails to meet the home use and portability criteria as well. The Ellsworth motion simulator is portable but it is not light-weight or small. It is definitely not suitable for home use or portable at the personal level.

(b) Installation of the motion base is simple. The portable and compact motion simulator can be used like a seat cushion. Installation or set-up includes the following steps:

1) placing the motion simulator on a sturdy chair;
2) connecting the motion simulator to the home computer or a control device; and
3) plugging the motion simulator to a standard 110V electrical wall outlet.

In comparison, the Ellsworth portable motion simulator require each of the six roadable trailers to be individually lifted into place by portable cranes or jacks.

(c) The movable platform includes an accommodation for a patron. In the simplest form, the platform provides a sitting surface. By making the accomodation an integral part of the platform, it simplifies the structure of the simulator. Both the part count and overall cost are reduced; more importantly, the overall vertical height is minimized.

(d) The portable and compact motion simulator is capable of creating a sense of motion for a patron the size of a fully grown adult. The motion simulator is engineered to provide dynamic performance for an adult of 250 pounds in weight.

(e) This invention employs a direct drive system architecture which is superior to the multiple-gimbal systems in terms of dynamic response performance and efficiency. The multiple-gimbal system such as commonly used to stabilize gyros and the like, effectively provides different component rotational motion between successive platforms. Because of the need to support one platform on another, the multiple-gimbal system is inherently subject to excessive "dead" mass which can dynamically compromise its performance, particularly for high speed response applications. The direct drive system also demands less power, thus smaller actuators, than the comparable multiple-gimbal system.

(f) In motion theater applications, the compact motion simulator can replace existing seats in conventional theaters to allow conversion of existing theaters into motion theaters. While portability is not as relevant in this application, all other key attributes of the compact motion simulator design such as small size, light-weight, and ease to install are applicable. The modular design of the compact motion simulator system also allows lower maintenance costs for the theater operators. Repair and replacement can be done on the individual seats without having to shut down the entire system.

(g) In motion theater applications where the motions are pre-determined, all the compact motion simulators can be driven by a single common system controller. Each one of the compact motion simulators receive identical signals to produce motions that are synchronous to the visual image presentation. This arrangement allows a much more cost-effective system configuration.

(h) In motion theater applications where the space available to accommodate the motion simulator is less restrictive, hydraulic actuation can be installed instead of electric actuation. All the individual motion simulators will have their own fluid operated rams as means of actuation; and the motion simulators will be supplied by a single hydraulic pump and fluid reservoir to reduce cost of the overall system.

Further objects and advantages of our invention will become apparent from a consideration of the drawings and ensuing description.

DRAWING FIGURES

For a better understanding of the present invention, reference is made to the accompanying drawings in which FIGS. 1A and 1B show two prior-art motion simulator designs that incorporated some degree of miniaturization.

FIG. 2A pertains to our invention. The portable and compact motion simulator is shown to be used in a computer game application.

Figure 1A:
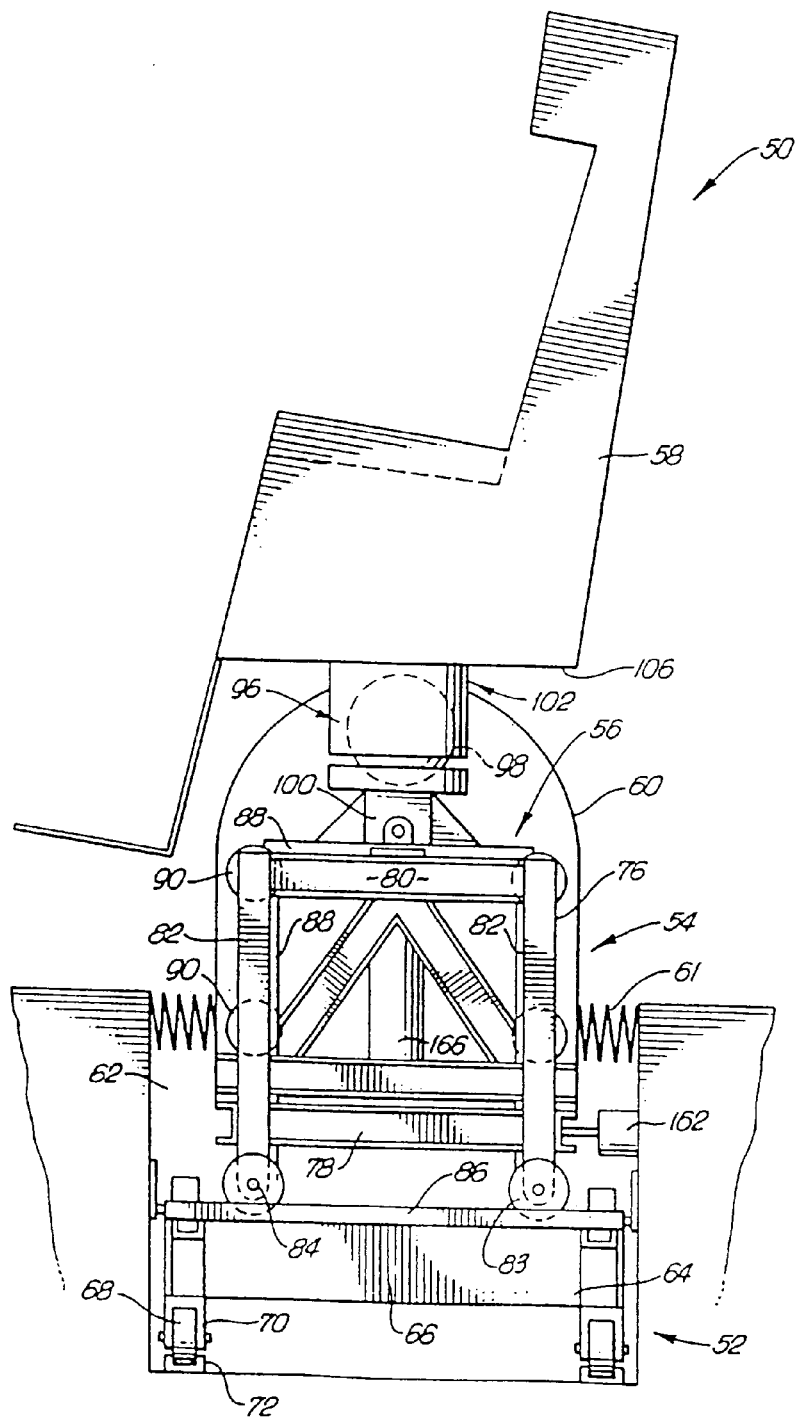
Figure 1B:
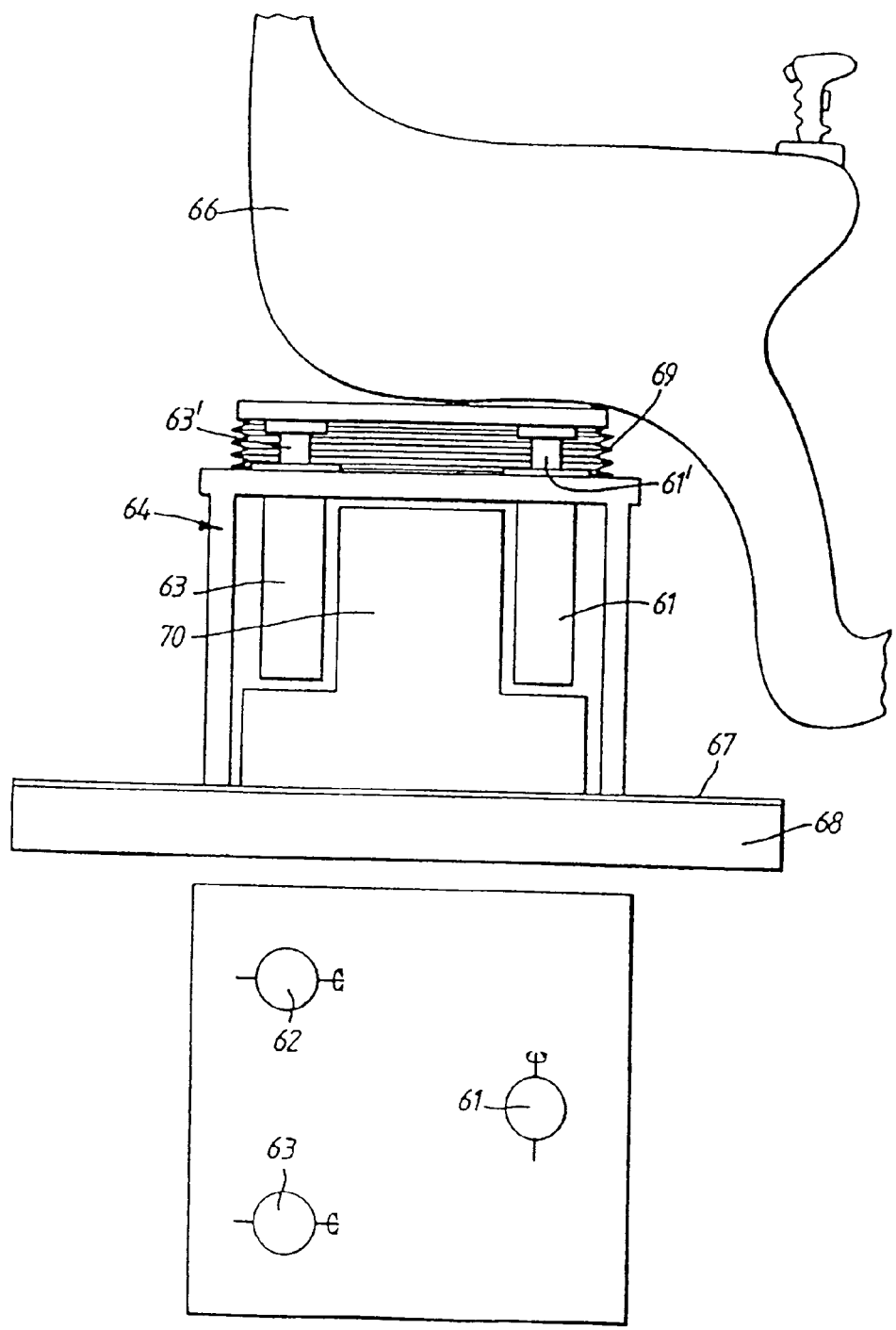

REFERENCE NUMERALS IN DRAWINGS 03 user
04 joystick
05 chair
06 home computer
07 projector
08 speaker
09 screen 10 portable and compact motion simulator
12 system controller
14 pitch
16 roll
18 heave 20 support base
22 platform
24 powered and controlled extensible member
26 controller
28 support column 30 multi-purpose joint atop a powered and controlled extensible member
32 pivot joint atop a support column
40 actuation screw 42 machined block
46 square profile
48 internal thread 50 oversized opening
52 retainer
54 mounting screw
56 oversized square profile counterbore 60 screw
62 spring washer
64 counterbore
66 oversized hole
68 cylindrical pivot

SUMMARY

This invention relates to a portable and compact motion simulator that is small in size and light-weight. Portability allows it to be used effectively in the home environment and be stored away in a closet or garage when not in use. The portable and compact motion simulator is made up to two essentially parallel plates: the platform and the support base. Three actuators are placed between the two plates connecting them without restricting relative movement of the attachment points. Each one of the three actuators is extensible singly or in concert with the others. The platform is driven by the actuators via the motion base controller to pitch, roll, heave, or in combination. Actuation can be electric or hydraulic depending on the application. The motion simulator can be used like a seat cushion. The portable and compact motion simulators are designed to simulate motion for a person playing an interactive computer game or participating in a virtual reality experience. Such motion simulators can also be adopted for viewing a visual theater presentation. A different version of the portable and compact motion simulator allows pitch, roll, or in combination.

DESCRIPTION OF INVENTION

Figure 2A:
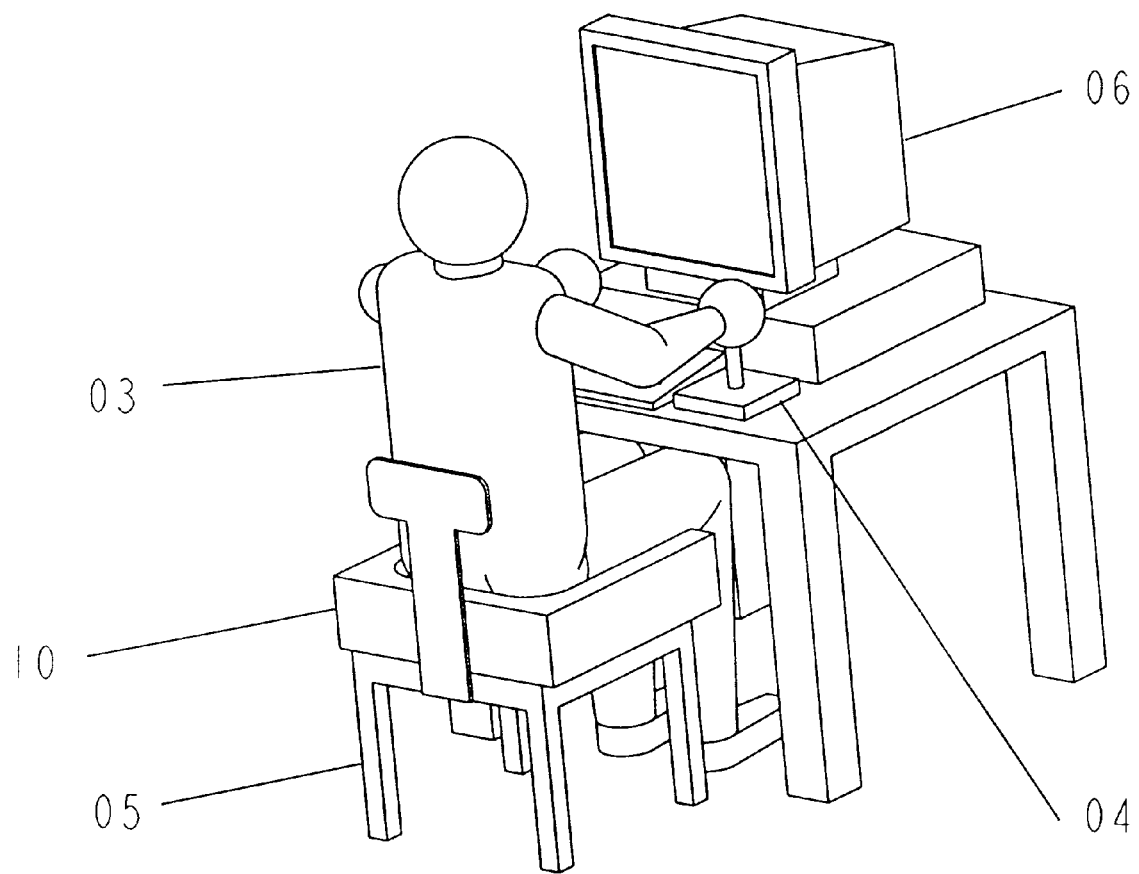
FIG. 2B depicts the compact motion simulator system configuration in a visual theater application.
Figure 2B:
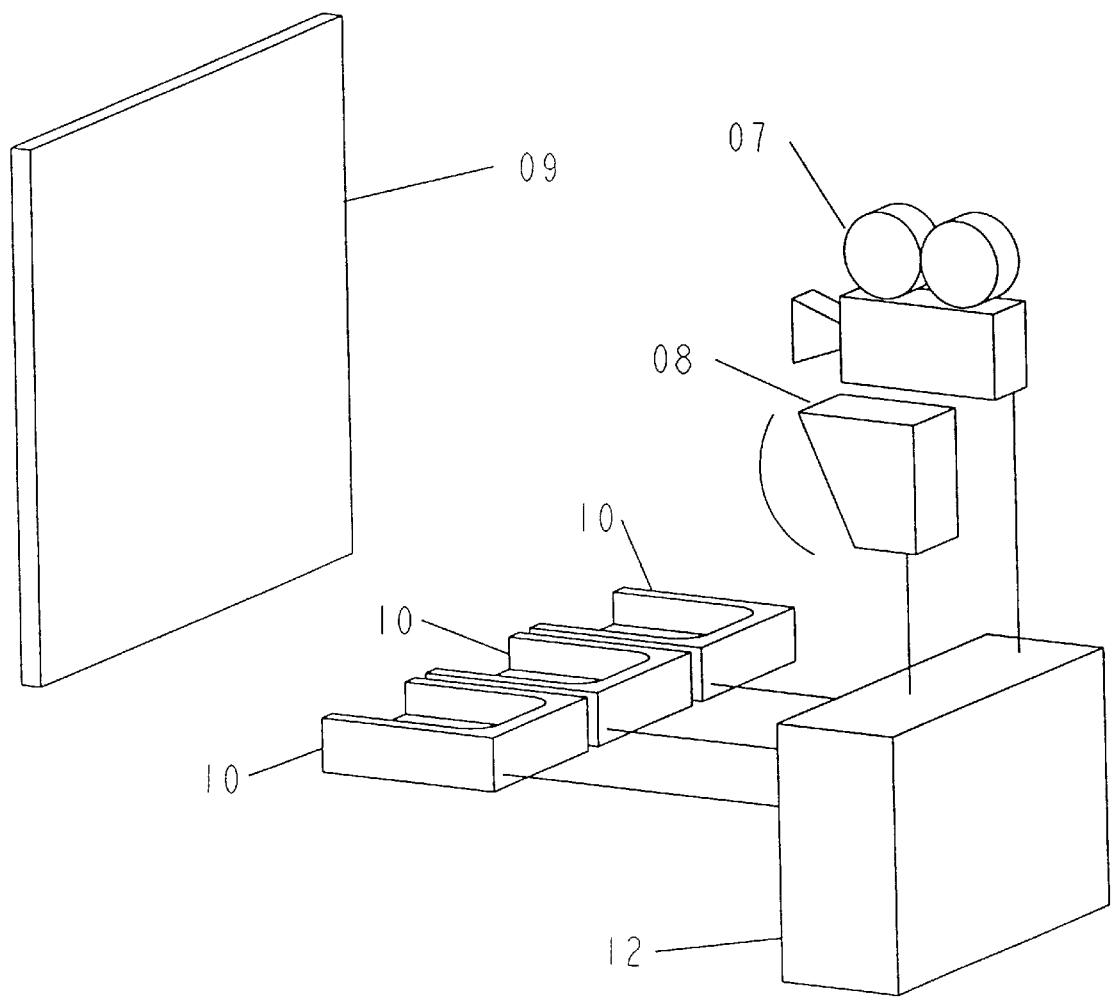

In FIG. 2A, the portable and compact simulator (10) of this invention is shown to be used in an interactive computer game play. The user (03) sits on the motion simulation (10) which is placed on a chair (05). The motion simulator (10) is connected to a home computer (06) and a joystick (04). In FIG,2B, the portable and compact motion simulators (10) are shown to be used in a visual theater presentation. The motion simulators (10), the projector (07), and the speaker (08) are connected to the common system controller (12). The imparted motion in all the motion simulators (10) are synchronous to visual images from the projector (07) onto a screen (09) and sound from the speaker (08).

Figure 3:
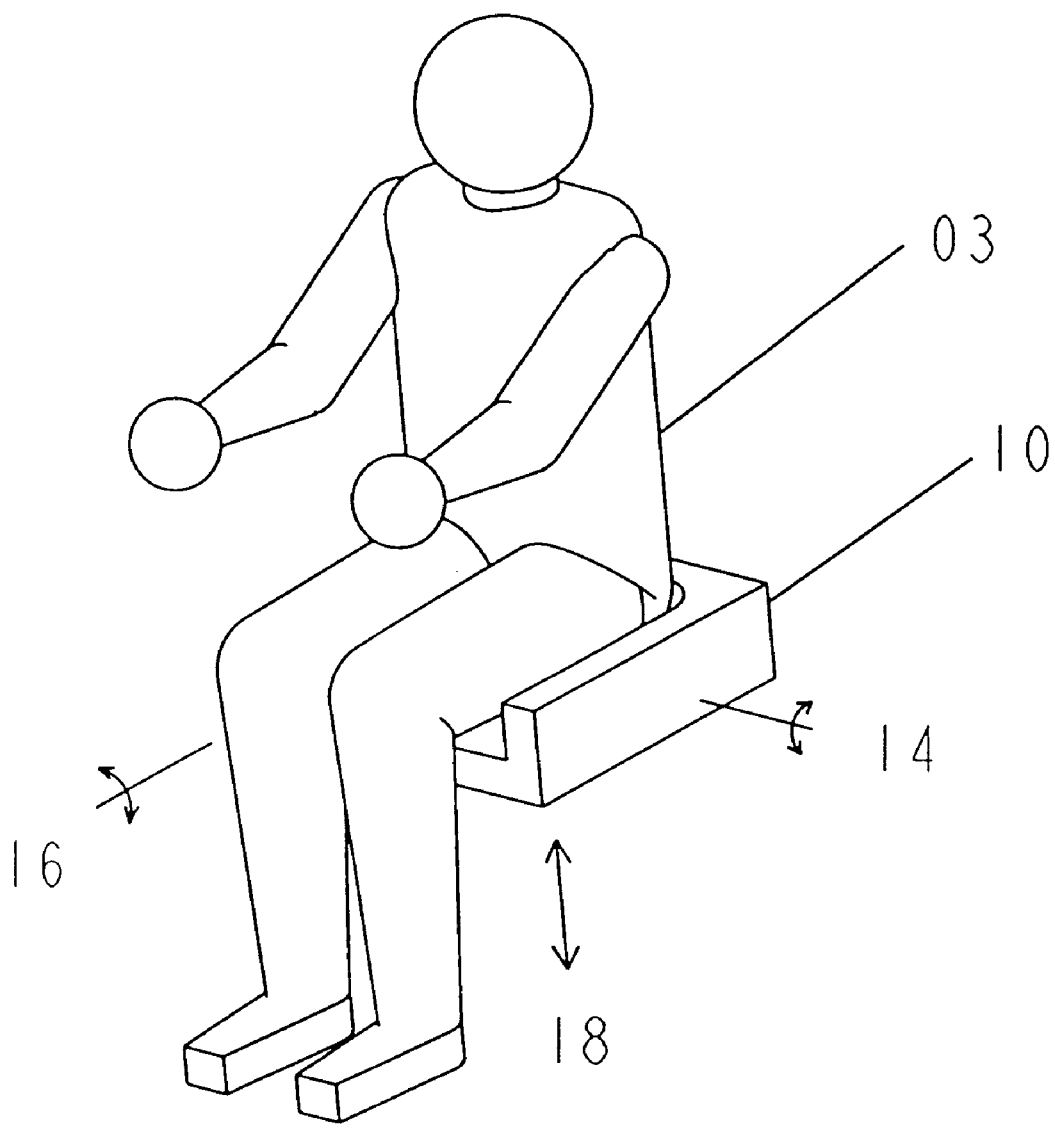
FIG. 3 depicts the different types of motion that the portable and compact motion simulator can deliver.

In FIG. 3, a user (03) is shown to be seated on the portable and compact motion simulator (10). The different types of motion include pitch (14), roll (16), and heave (18).

Figure 4:
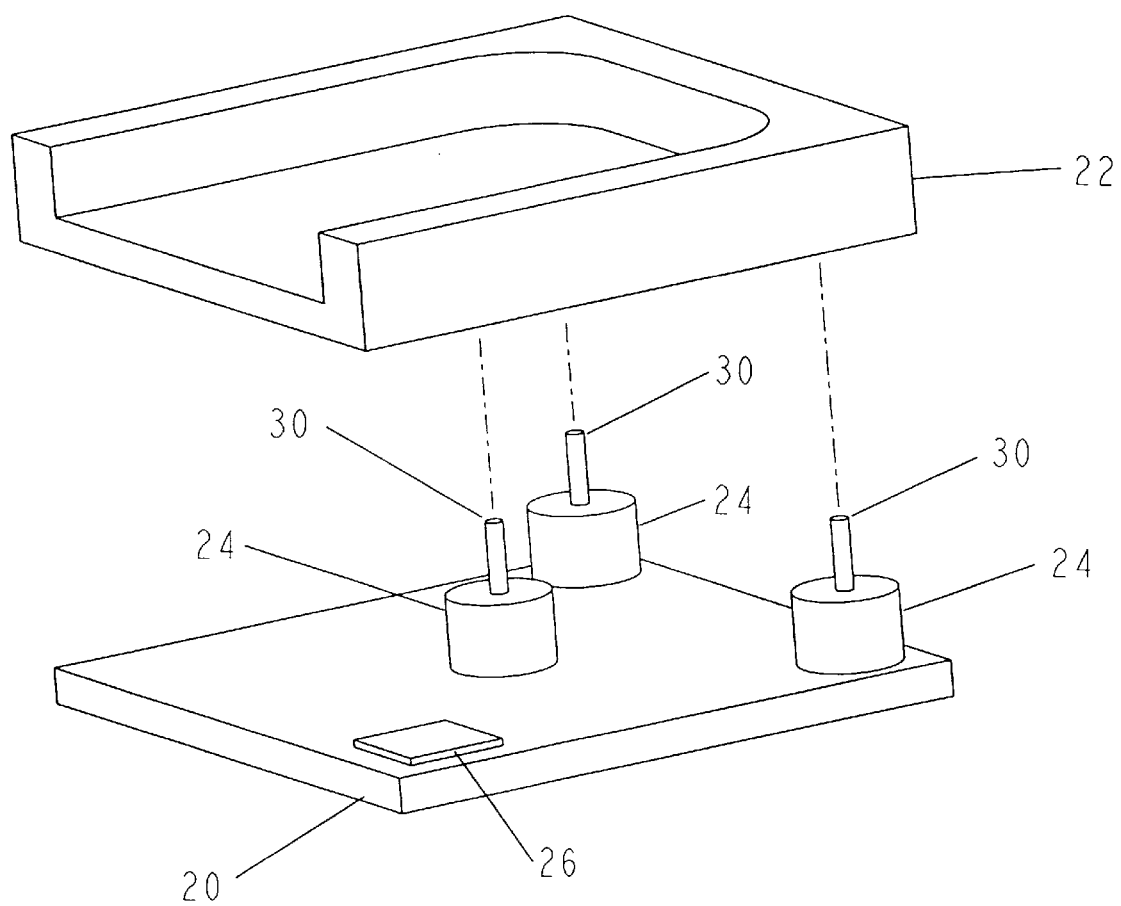
FIG. 4 shows an exploded view of the 3 degree-of-freedom portable and compact motion simulator.

In FIG.4, the portable and compact motion simulator (10) of this invention is shown in a three degree-of-freedom configuration with electric actuation. It is made up of two plate like structures: a movable platform (22) on the top and a support base (20) at the bottom. The support base (20) which supports the rest of the simulator is a flat plate. It also allows mounting provisions for many simulator components. The platform (22) supports and transfers motion to the patron. Three powered and controlled extensible members (24) are connected between the underside of the platform (22) and the support base (20). A connection or joint (30) permitting universal relative movement about the point is provided at the top of each extensible member (24). These extensible members (24) are actuated through the motion base controller (26).

The joints (30) are intended to permit essentially universal movement. They are designed to accommodate positioning of any of the positions permitted by the geometry of the device including the entire range of possible extension and contraction of the extensible members (24). The placement of these extensible members (24) shown is the preferred configuration, but it is not critical to the design of our motion simulator. In the present state of the art, many means are known for actuating the extensible members and any suitable means may be employed. The actual shape of the top surface of the platform (22) allows a shorter overall vertical height but it is not essential to our motion simulator.

The motion base, when adopted for interactive computer game play, is connected to the computer. The motion base controller (26) receives control signals from the computer and the control device. Alternatively, the motion base controller (26) can be connected directly to the control device to receive control signals.

In applications where hydraulic actuation is used in the motion simulator, each extensible member (24) comprises of a fluid operated ram with extendible piston.

Figure 5:
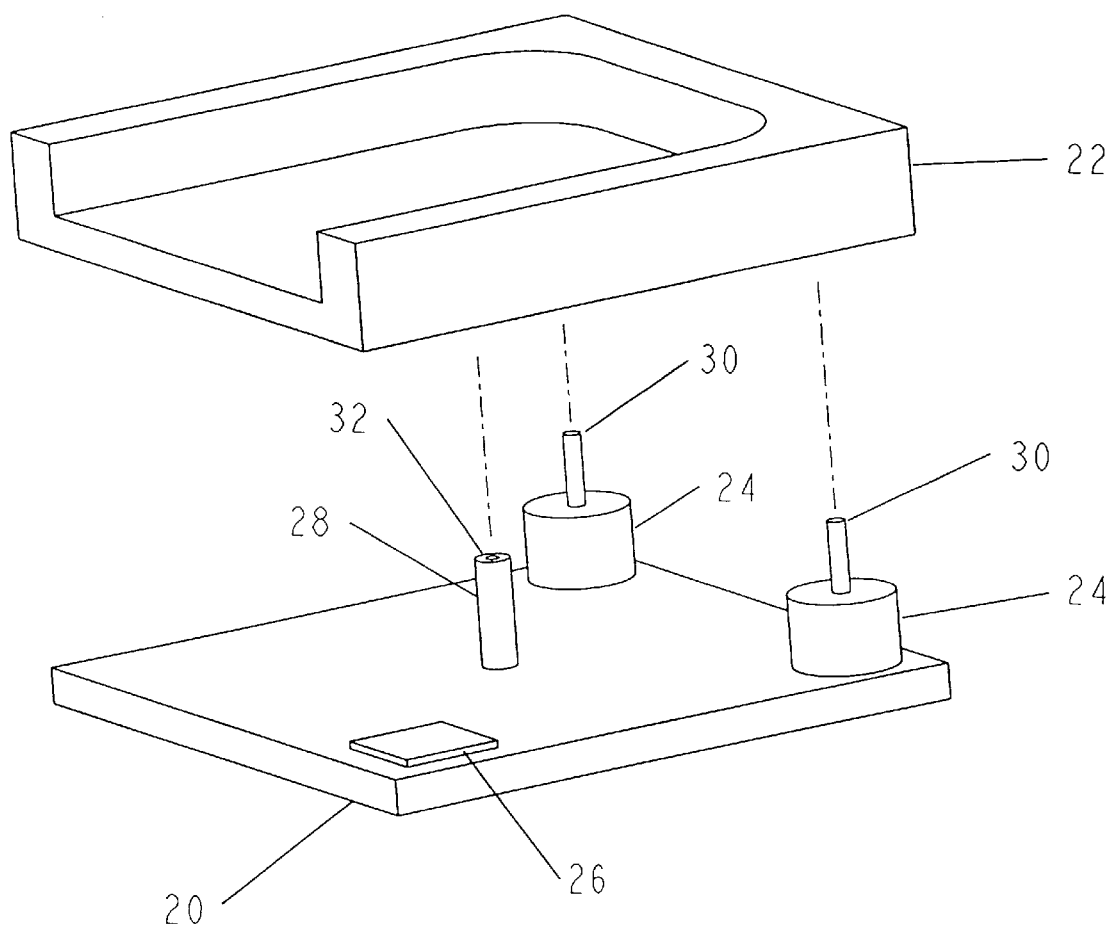
FIG. 5 shows an exploded view of the 2 degree-of-freedom portable and compact motion simulator.

Referring now to FIG. 5, the portable and compact motion simulator of this invention is shown in a two degree-of-freedom configuration with electric actuation. The construction is structurally different from that of the three degree-of-freedom motion simulator with the use of the support column (28). This simulator is comprised of a support base (20), a platform (22), two extensible members (24), a support column (28), and a motion base controller (26). The support column is located approximately at the center of the support base (20). Atop the support column is a connection or joint (32) permitting universal rotational movement about the point. This pivot joint (32) is different from the joints (30) atop the extensible members (24) and it will be described in detail in the following text.

A joint (30) permitting universal relative movement about the point is provided at the top of the two extensible members (24). These powered and controlled extensible members (24) are actuated through the motion base controller (26). The placement of the support column (28) and the two extensible members (24) shown is the preferred configuration, but it is not critical to the design of our motion simulator. In the present state of the art, many means are known for actuating the extensible members and any suitable means may be employed. The actual shape of the top side of the platform (22) allows a shorter overall vertical height but it is not essential to our motion simulator.

Figure 6A:
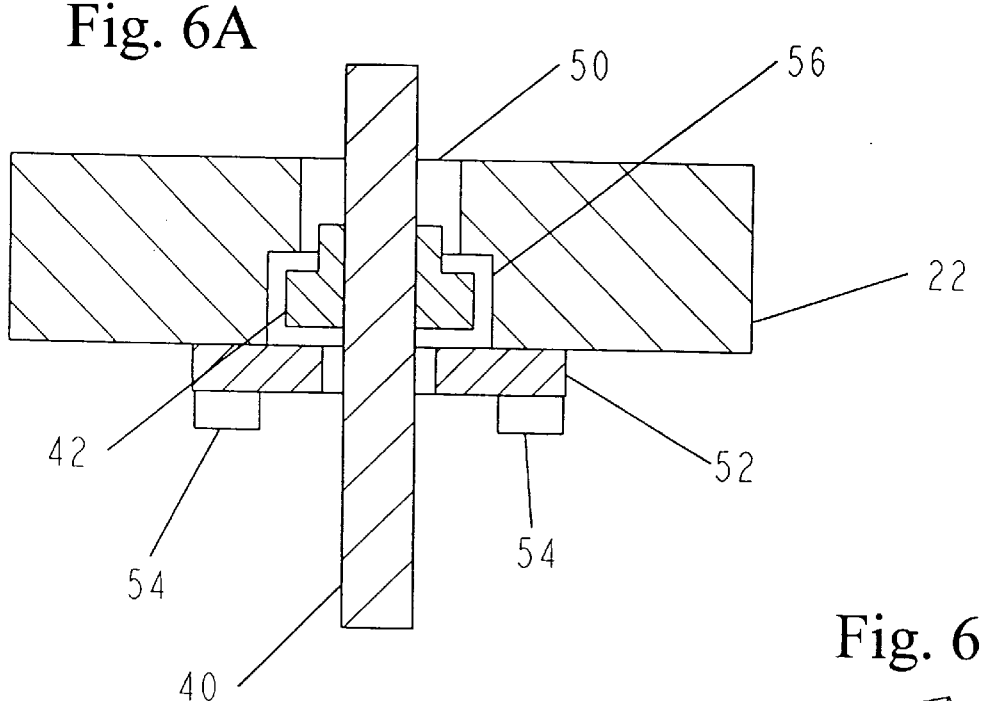
FIG. 6A shows a multi-purpose joint atop a powered and controlled extensible member.
Figure 6B:
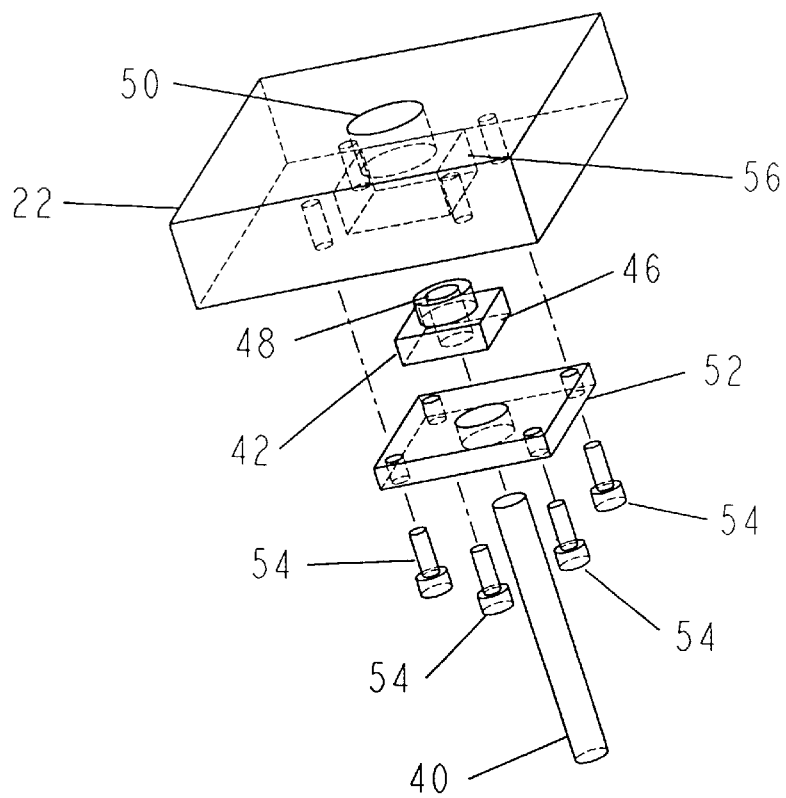
FIG. 6B shows an exploded view of a multi-purpose joint atop a powered and controlled extensible member.

Referring now to FIG. 6A and FIG. 6B, a low-cost multi-purpose joint (30) which permits relative movement between the extensible members (24) is depicted. It is intended to be used at the top of the extensible members in both the three degree-of-freedom motion simulator and the two degree-of-freedom motion simulator. In addition to providing relative movement, this joint (30) allows power transfer from an actuation screw (40) to the platform (22). The hardware involves a machined block (42) which has a square cross-section profile (46). Internal threads (48) are cut in the center through the block to accept the actuation screw (40). The block is installed in a cavity (56) in the platform (22) with an oversized opening (50). The installed machined block (42) functions as a floating nut. The retainer (52) is secured to the underside of the platform (22) at four locations with mounting screws (54).

Figure 7:
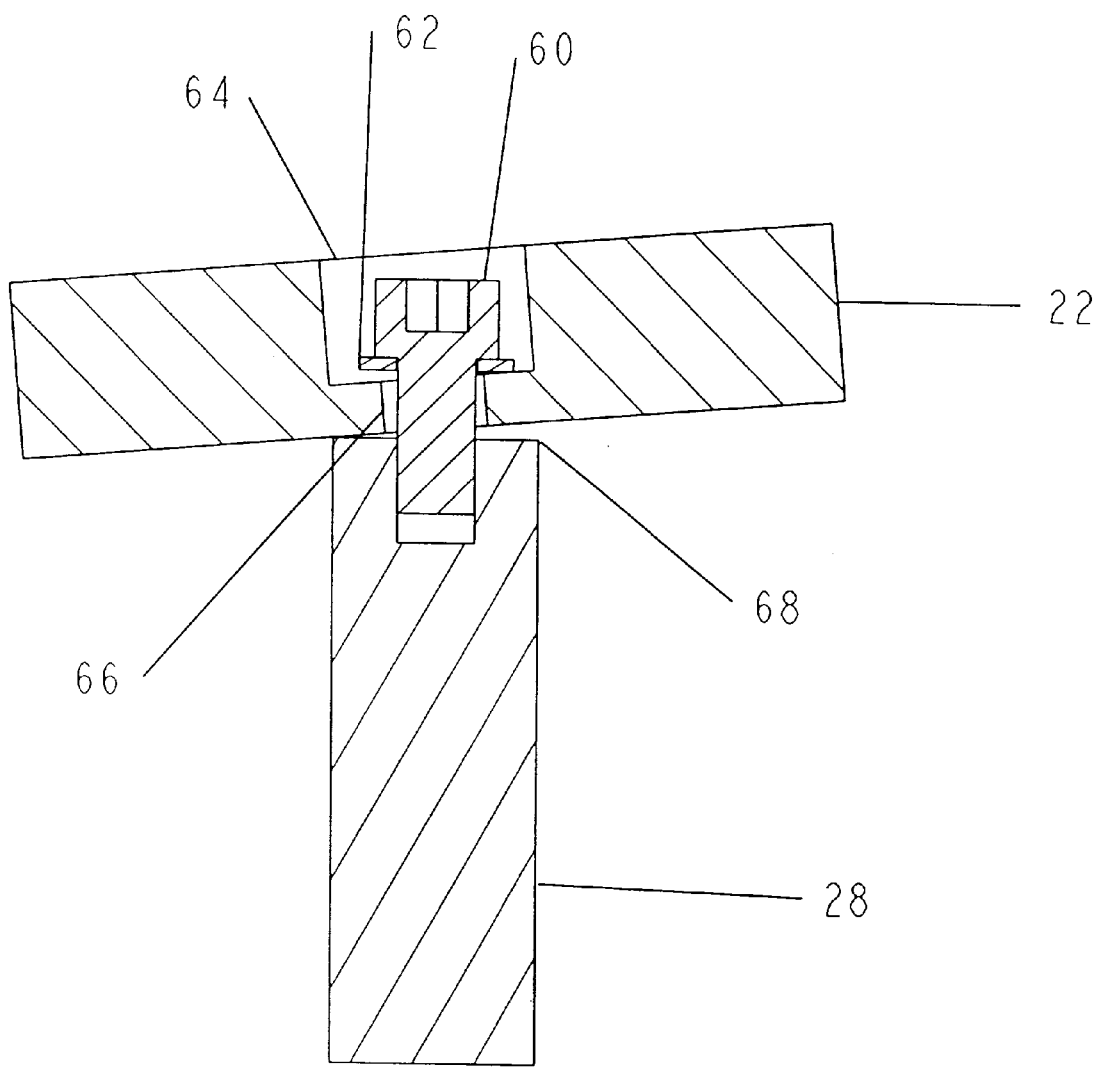
FIG. 7 shows the details of the support column in the 2 degree-of-freedom portable and compact motion simulator.

Referring now to FIG. 7, details of pivot joint (32) at the top or the support column (28) are shown. The joint (32) is comprised of a screw or shoulder bolt (60) and a spring washer (62). The screw (60) holds the platform (22) down to the support column (28) by bolting through an oversized hole (66) in the platform. The screw (60) and the spring washer (62) are installed in a counterbore (64) in the platform (22). The top of the support column (28) is in the form of a cylinder providing a bearing area to serve as a non-stationary pivot (68).

Operation

When the motion simulator (10) is used in an interactive computer/video game, it is connected to the electrical outlet for power. For the signal input, it is connected to the home computer (06) or a video console and a control device like a joystick (04). In the case of computer game, the home computer (06) has computer program game software installed within to generate visual imagery on the video monitor. In one set-up, the motion base controller (26) is connected to the home computer (06). As the computer receives signal from the control device, signals from the control device is simultaneously sent to the motion base controller. It is also possible to have the signals sent directly from the computer program to the motion base controller (26) via the computer. In another set-up, the motion base controller (26) is connected to the control device (04) to receive input signals from the control device (04). In this mode, both the computer program and the motion base controller receive identical signals from the control device (04). Synchronization between the visual imagery on the video monitor and the motion generated by the motion simulator (10) is therefor achieved.

Referring now to FIG. 4 which depicts the 3 degree-of-freedom motion simulator. Actuation of the three powered and controlled extensible members (24) in coordination can effect pitch, roll, and heave motions. It can also produce combined pitch, roll, and heave motions in various proportions. As the platform (22) is moved from being parallel to the support base (20), relative movements between the extensible members (24) on the platform (22) side are produced. Such movements tend to lock up the extensible members (24). To alleviate such relative movement, flexibility has to be built into the joints (30) between the top of the extensible members (24) and the platform (22). Such joints (30) will have to allow relative movement between the extensible members (24) as a result of the angulation. These joints will be discussed in detail in the following text.

Although the extensible members (24) are shown to be at the center and two back corners, the actual placement of the extensible members (24) can be configured in many different fashions. Similarly, the placement of the motion base controller (26) can be at locations different from what is depicted in FIG.4. The actual shape of the top side of the platform (22) allows a shorter overall vertical height but it is not essential to our motion simulator.

Referring now to FIG. 5 which depicts the 2 degree-of-freedom motion simulator. Actuation of the two extensible members (24) in coordination can effect pitch, roll, or combined pitch and roll motions. As the platform (22) moves from being parallel to the support base (20), relative movements between the extensible members (24) on the platform (22) side are produced. Such movements tend to lock up the extensible members (24). To allleviate such relative movement, flexibility has to be built into the joints (30) between the top of the extensible members (24) and the platform (22). Such joints (30) will have to allow relative movement between the extensible members (24) as a result of the angulation. Atop the support column (28) is another type joint (32). It provides a non-stationary pivot for the platform (22) regardless of the angulation between the platform (22) and the support base (20).

The low-cost multi-purpose joint (30) atop the powered and controlled extensible members is depicted in FIG. 6A and FIG. 6B. Once installed, the machined block (42) acts as a floating nut. It can move in all different directions with limited travel. The actuation screw (40) is allowed to runout and protrude beyond the platform (20) through the oversized opening (50). As the actuation screw (40) turns, the machine block (42) will also turn until it is locked up against the oversized square profile counterbore (56) in the platform (22). At that point, the power screw action will drive the platform (22) up or down accordingly.

Referring now to FIG. 7, a pivot joint (32) is shown to be atop the support column (28). A screw or shoulder bolt (60) holds the platform (22) to the support column (28). As the platform (22) is moved away from being parallel to the support base (20), the underside of the platform (22) will physically rest on the top of the support column (28). The latter is in the form of a cylinder so the bearing surfaces will be along the edge of the cylinder. Thus, the platform (22) is supported by the support column (28) at one point along the edge of the cylinder. This contact point provides a fulcrum for the angulation of the platform (22). The exact location of this contact point is a function of the amount of pitch and roll. Therefore this cylindrical pivot (68) is non-stationary in nature. As part of the engineering design and analysis efforts, the length of the screw (60) has to be related to the amount of angulation allowed in the system. Too much angulation will induce unnecessary tension in the joint and possibly bending in the screw (60). The oversized hole (66) is also essential in allowing angulation of the platform (22) with respect to the support base (20).

Alternatively, functionality of the support column and its cylindrical pivot joint can be collectively served by a support column made of a flexible material. The support column can be in the form of a cylinder or other geometry. The need for bearing surface area can be completely eliminated. In such case, the support column will be designed to support the weight of the patron in the heave direction and to allow angulation brought by pitch and roll motion.

Summary, Ramifications, and Scope

This invention relates to a portable and compact motion simulator that is small in size, light-weight, portable, and easy to install.

The portable and compact motion simulator is believed to have large commercial potential in the interactive computer, game and virtual reality applications. Because of the compact size and ease of installation, the compact motion simulator further lends itself to be a low-cost solution in motion theater applications.

The portable and compact motion simulator can be in different physical forms other than a seat or part of a chair. It can be installed on the floor with the platform in the form of a simple flat plate. The patron can stand on the platform to engage in a virtual reality type of game play. The motion simulator system will be able to generate motion to the patron in this format. Alternatively, the compact motion simulator can be installed in the inverted position. The support base can be bolted to a ceiling structure with the platform hanging off the base. Some harness or suspension system can be installed to the platform to support the weight of the patron. Through the action of the compact motion simulator, the patron will be moved through the simulation. The three or two degree-of-freedom versions of this invention can be further pared down in tradeoff between complexity and range of motion. The three degree-of-freedom motion simulator can be reduced to other two degree-of-freedom systems with pitch and yaw, or roll and yaw. Similarly, the two degree-of-freedom motion simulator can be reduced to a single degree-of-freedom system in pitch or roll. For example, a portable and compact motion simulator, with a single degree-of-freedom in roll, can adequately simulate the action of a bobsled.

The compact and portable motion simulator is used in conjunction with a home computer for interactive computer game play. The home computer can be selected from the group of Intel-based personal computers, other types of personal computers, work stations, or video consoles which are specific purpose computers built for video game play.

Placement of the actuators in the portable and compact motion simulator, which determines the packaging envelope, is not as critical if more room is allowed for the installation. For example, in the theater application where the motion simulator can be installed in a vertical space larger than the comparable height of a seat cushion, the vertical envelope can be increased. In such case, the actuators can be placed at different locations to simplify the signal control for the motion base controller and coordination between the different actuation.

The pivot joint is comprised of a screw and a spring washer. The spring action of the washer allows positive engagement regardless of the angulation of the platform to the support base. Between the pivot joint and the two extensible members, the platform is statically determinant. It is conceivable that the screw and spring washer can be replaced with a simple shaft or guide pin in order to reduce cost. Such arrangement can function in a similar manner when the platform is loaded. However, the platform can be lifted out of its calibrated position during handling. It is also conceivable that the spring washer can be replaced with one or more flexible members and a flat washer; for example, a grommet can be trapped under the flat washer by the screw. In such case, the new pivot joint can function similar to the preferred embodiment without any shortcomings.

The flexible support column design in the two degree-of-freedom motion simulator can be in a variety of physical forms: a flexible column with various cross-sections, a flexible channel, or a number of flexible column with small cross-sections. The flexible support Column can also be built as an integral design of the platform-support base structure. While the integral design affords only a single physical part, the distinct functions of the platform, the support base, and the support column are unmistakable.

The electric motor and power screw combination affords the smallest packaging envelope. A similar actuation system can be constructed with permanent magnets and electric coils. Forces can be developed by running current through the electric coil to produce magnetic forces with very short response time. The developed forces will work with or against the magnetic forces exerted by the permanent magnet depending on the control signal. The current technical capability is such that the amount of magnetic forces developed cannot support a fully grown adult. Even with the latest high density permanent magnets, the capability is far from what's required in this application. However, the research on superconducting material may someday make this possible.

It is thought that with a low-cost motion simulator, an individual visual theater presentation can become commercially viable. In such case, the visual effects are displayed for the benefit of a single patron rather than a large number of patrons.

Although the description above contains many specificities, these should not be construed as limiting the scope of the invention but as merely providing illustrations of some of the presently preferred embodiments of this invention. It will be apparent to those skilled in the art that various modifications and improvements may be made without departing from the scope and spirit of the invention. Thus the scope of the invention should be determined by the appended claims and their legal equivalents, rather than by the examples given.

We claim:

1. A portable motion base for providing motion in three degrees of freedom, which including pitch, roll and heave, or any combination thereof, comprising:

platform means having three points of connection which lie generally in a plane;

support base means having three points of connection in another plane;

actuator means having only three powered and controlled extensible members, wherein each one of said powered and controlled extensible members including movable member and joint means, and each one of said powered and controlled extensible members being connected between a different one of said three connection points of said platform means and a different one of said three connection points of said support base means by said joint means for permitting any relative movement between each one of said powered and controlled extensible members; and controller for actuating said movable member of each one of said powered and controlled extensible members in the selective changes in length, thereby providing motion in three degrees of freedom;

wherein said portable motion base is in the form of a part of a chair having accommodation means for a patron, and wherein said controller including communication means for receiving external control signals from a motion control device which controlled by said patron, thereby providing an interactive motion simulation.

2. The portable motion base of claim 1, wherein said movable member of each of said powered and controlled extensible members is a screw, and wherein each one of said powered and controlled extensible members further comprises an electric motor and a floating nut threadably received on said screw.

3. The portable motion base of claim 2, wherein said joint means of each one of said powered and controlled extensible members comprises said screw, said floating nut and a cavity in said platform which provides reception means to said floating nut.

4. The portable motion base of claim 1, wherein said powered and controlled extensible members further comprises a fluid operated ram, and said movable members of said powered and controlled extensible members is an extendible piston.

5. A portable simulator system for providing interactive motion simulation, comprising:

a portable motion base in the form of a part of a chair having accommodation means for a patron, said portable motion base including platform means having three points of connection which lie generally in a plane;

support base means having three points of connection in another plane;

actuator means having only three powered and controlled extensible members, wherein each one of said powered and controlled extensible members including movable member and joint means, and each one of said powered and controlled extensible members being connected between a different one of said three connection points of said platform means and a different one of said three connection points of said support base means by said joint means for permitting any relative movement between each one of said powered and controlled extensible members; and motion base controller for actuating said movable member of each one of said powered and controlled extensible members in the selective changes in length, thereby providing motion in three degrees of freedom, which including pitch, roll and heave, or any combination thereof; and computer means having memory means for storing program means, a motion control device, and a video monitor for displaying a changing video image on said monitor in response to control signals from said motion control device controlled by said patron and said program means;

wherein said portable motion base is adapted to said computer means, and wherein said motion base controller including communication means for receiving control signals from said motion control device and said program means, thereby providing motion in synchronization with the changing video image on said monitor.

6. A simulator system for providing an event simulation to at least one of a plurality of patrons, comprising:

a plurality of individual motion motion bases, wherein each of said plurality of motion bases is in the form of a part of a chair having accommodation means for a patron, each of said plurality motion bases including platform means having three points of connection which lie generally in a plane;

support base means having three points of connection in another plane;

actuator means having only three powered and controlled extensible members, wherein each one of said powered and controlled extensible members including movable member and joint means, and each one of said powered and controlled extensible members being connected between a different one of said three connection points of said platform means and a different one of said three connection points of said support base means by said joint means for permitting any relative movement between each one of said powered and controlled extensible members; and motion base controller for actuating said movable member of each one of said powered and controlled extensible members in the selective changes in length, thereby providing motion in three degrees of freedom, which including pitch, roll and heave, or any combination thereof;

audio-visual display means for providing a sequence of audio and video image signals to said patrons; and a system controller having program means; said system controller for generating control signals to each of said motion base controller of said plurality of motion bases in synchronization with the presentation of said sequence of audio and video image signals.

7. A portable motion base for providing motion in two degrees of freedom, which including pitch and roll, or any combination thereof, comprising:

platform means having three points of connection which lie generally in a plane;

support base means having two points of connection in another plane;

a support column extending from said support base means to a connection point in said platform means, wherein said support column having coupling means for permitting rotational movement about said connection point and providing a pivot at said connection point;

actuator means having only two powered and controlled extensible members, wherein each one of said powered and controlled extensible members including movable member and joint means, and each one of said powered and controlled extensible members being connected between a different one of said three connection points of said platform means and a different one of said two connection points of said support base means by said joint means for permitting any relative movement between each one of said powered and controlled extensible members; and controller for actuating said movable member of each one of said powered and controlled extensible members in the selective changes in length, thereby providing motion in two degrees of freedom;

wherein said portable motion base is in the form of a part of a chair having accommodation means for a patron, and wherein said controller including communication means for receiving external control signals from a motion control device which controlled by said patron, thereby providing an interactive motion simulation.

8. The portable motion base of claim 7, wherein said support column is cylindrical in shape providing a bearing area along the edge of said cylinder, and wherein said bearing area provides a non-stationary pivot.

9. The portable motion base of claim 7, wherein said support column is a flexible member.

10. The portable motion base of claim 7, wherein said movable member of each of said powered and controlled extensible members is a screw, and wherein each one of said powered and controlled extensible members further comprises an electric motor and a floating nut threadably received on said screw.

11. The portable motion base of claim 10, wherein said joint means of each one of said powered and controlled extensible members comprises said screw, said floating nut and a cavity in said platform which provides reception means to said floating nut.

12. The portable motion base of claim 7, wherein said powered and controlled extensible members further comprises a fluid operated ram, and said movable members of said powered and controlled extensible members is an extendible piston.

13. A portable simulator system for providing interactive motion simulation, comprising:

a portable motion base in the form of a part of a chair having accommodation means for a patron, said portable motion base including platform means having three points of connection which lie generally in a plane;

support base means having two points of connection in another plane;

a support column extending from said support base means to a connection point in said platform means, wherein said support column having coupling means for permitting rotational movement about said connection point and providing a pivot at said connection point;

actuator means having only two powered and controlled extensible members, wherein each one of said powered and controlled extensible members including movable member and joint means, and each one of said powered and controlled extensible members being connected between a different one of said three connection points of said platform means and a different one of said two connection points of said support base means by said joint means for permitting any relative movement between each one of said powered and controlled extensible members; and motion base controller for actuating said movable member of each one of said powered and controlled extensible members in the selective changes in length, thereby providing motion in two degrees of freedom, which including pitch and roll, or any combination thereof; and computer means having memory means for storing program means, a motion control device, and a video monitor for displaying a changing video image on said monitor in response to control signals from said motion control device controlled by said patron and said program means;

wherein said portable motion base is adapted to said computer means, and wherein said motion base controller including communication means for receiving control signals from said motion control device and said program means, thereby providing motion in synchronization with the changing video image on said monitor.

14. A simulator system for providing an event simulation to at least one of a plurality of patrons, comprising:

a plurality of individual motion bases, wherein each of said plurality of motion bases is in the form of a part of a chair having accommodation means for a patron, each of said plurality motion bases including platform means having three points of connection which lie generally in a plane;

support base means having two points of connection in another plane;

a support column extending from said support base means to a connection point in said platform means, wherein said support column having coupling means for permitting rotational movement about said connection point and providing a pivot at said connection point;

actuator means having only two powered and controlled extensible members, wherein each one of said powered and controlled extensible members including movable member and joint means, and each one of said powered and controlled extensible members being connected between a different one of said three connection points of said platform means and a different one of said two connection points of said support base means by said joint means for permitting any relative movement between each one of said powered and controlled extensible members; and motion base controller for actuating said movable member of each one of said powered and controlled extensible members in the selective changes in length, thereby providing motion in two degrees of freedom, which including pitch and roll, or any combination thereof;

audio-visual display means for providing a sequence of audio and video image signals to said patrons; and a system controller having program means; said system controller for generating control signals to each of said motion base controller of said plurality of motion bases in synchronization with the presentation of said sequence of audio and video image signals.

* * * * *